United States Patent [19]
Elliott

[11] Patent Number: 5,652,682
[45] Date of Patent: Jul. 29, 1997

[54] APPARATUS FOR LOADING AND UNLOADING CARTRIDGES

[75] Inventor: Robert Vernon Elliott, Wells, United Kingdom

[73] Assignee: M4 Data Limited, United Kingdom

[21] Appl. No.: 552,220

[22] Filed: Nov. 2, 1995

[30] Foreign Application Priority Data

Nov. 11, 1994 [GB] United Kingdom ............... 9422808

[51] Int. Cl.$^6$ ............................................. G11B 15/68
[52] U.S. Cl. ............................................. 360/92
[58] Field of Search ............................... 360/92

[56] References Cited

U.S. PATENT DOCUMENTS

| | | | |
|---|---|---|---|
| 4,891,720 | 1/1990 | Grant et al. | 360/92 |
| 5,157,564 | 10/1992 | Theobald et al. | 360/92 |
| 5,402,282 | 3/1995 | Eguchi | 360/92 |
| 5,537,268 | 7/1996 | Felde et al. | 360/92 |

FOREIGN PATENT DOCUMENTS

| | | |
|---|---|---|
| 0162248 | 4/1985 | European Pat. Off. . |
| 0249314 | 4/1987 | European Pat. Off. . |
| 2271014 | 6/1993 | United Kingdom . |

Primary Examiner—John H. Wolff
Attorney, Agent, or Firm—Renner, Otto, Boisselle & Sklar

[57] ABSTRACT

In one aspect, an apparatus for loading and unloading cartridges comprises a cartridge rack for storing an array of cartridges arranged adjacent to one another. A carriage having two compartments is provided for receiving cartridges from the rack, the compartments being offset relative to one another in the direction of the array. The apparatus includes a conveyor for moving cartridges from the rack into the compartments of the carriage, and the carriage is mounted for movement along the array whereby each of the cartridges can be brought into alignment with at least one of the compartments for reception thereby. In another aspect, the cartridge rack stores cartridges arranged side-by-side with respective edge faces of the cartridges supported by a floor of the rack, the floor having a plurality of openings aligned with respective edge faces of the cartridges, and the conveyor is mounted for movement beneath the floor of the rack into alignment with the openings. The conveyor is moveable upwardly into engagement with the edge face of a cartridge through the corresponding opening and operable to move the cartridge along the direction of the edge face thereof to withdraw the cartridge from the rack.

16 Claims, 6 Drawing Sheets

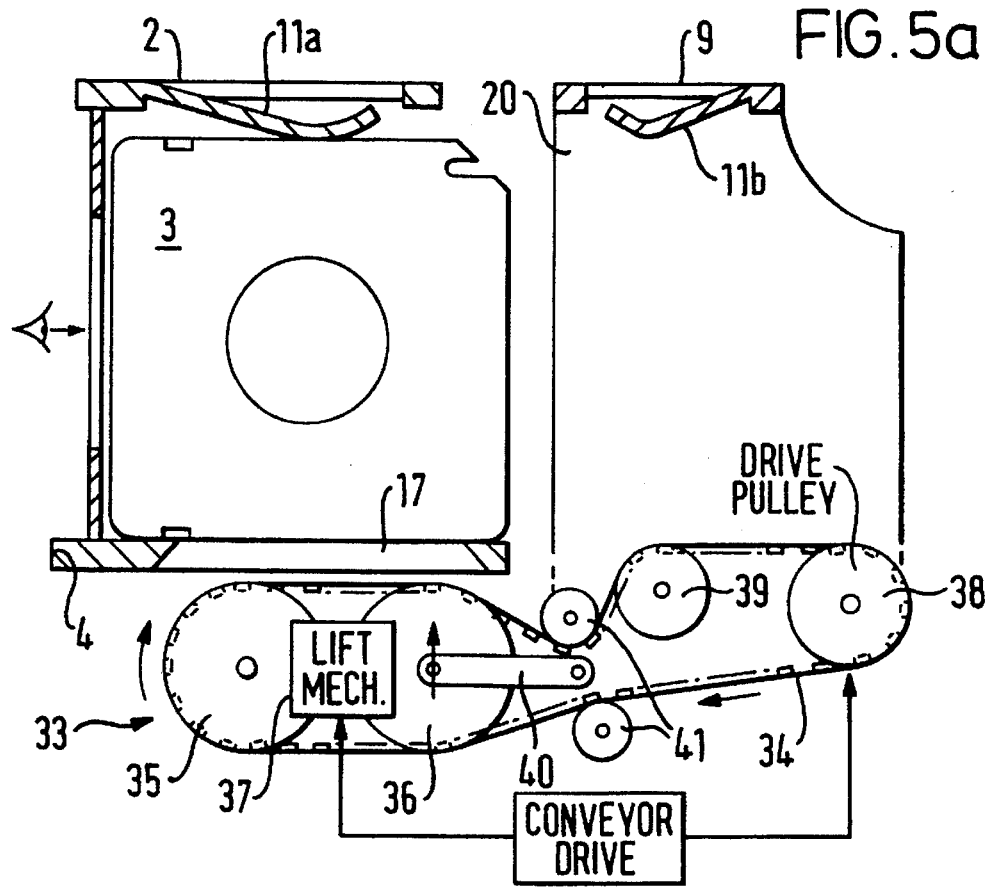
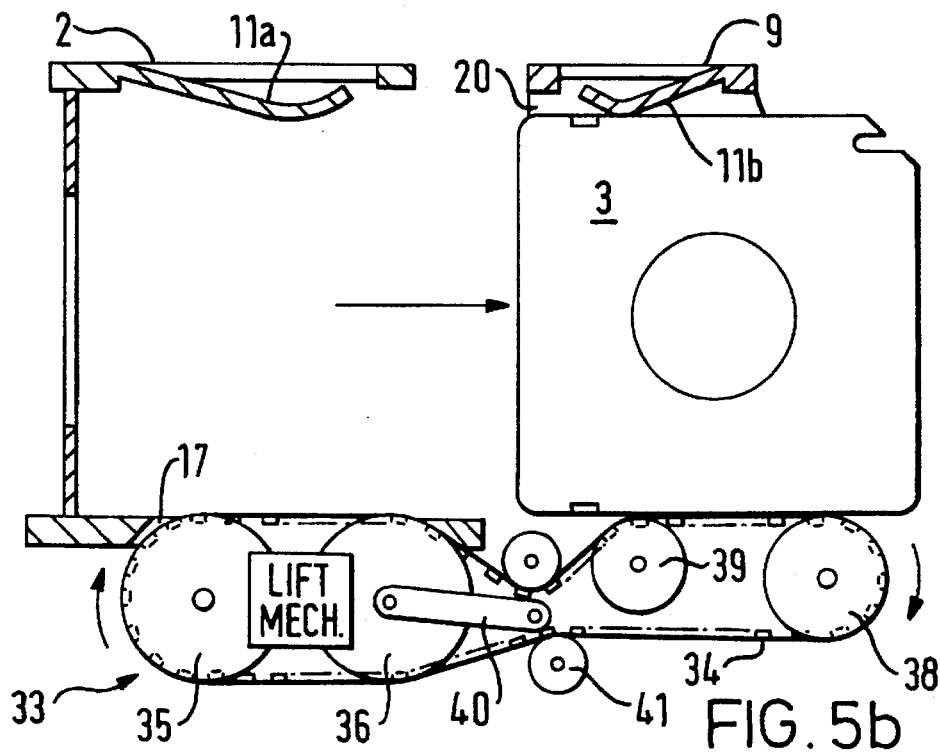

APPARATUS FOR LOADING AND UNLOADING CARTRIDGES

BACKGROUND OF THE INVENTION

1. Field of the Invention

This invention relates to autoloader apparatus for cartridges such as, for example, 3480 style half-inch tape cartridges.

Autoloader apparatus is typically used in automated data storage and retrieval systems for storing large amounts of data on magnetic tape cartridges for example. Such systems generally include a rack for storing the cartridges, a cartridge deck for recording/replaying the cartridges, and means for transferring cartridges between the rack and the deck. A control unit controls operation of the transfer means and the cartridge deck so that the required cartridges are selected, recorded or reproduced as required, and then returned to the rack.

2. Description of the Prior Art

In such autoloader systems, efficient use of space and simplicity of the operating mechanism are always important considerations, and it is desirable for the apparatus to be as compact and efficient as possible.

Autoloader systems are known in which the cartridge rack holds a vertical stack or horizontal row of cartridges, and the transfer means comprises a mechanical hand which grips a cartridge, extracts the cartridge from the rack and then carries the cartridge to the deck for insertion therein. However, on extracting a cartridge from the rack, the mechanical hand, as well as the cartridge, must be moved until the cartridge is clear of the rack before it can be manoeuvred towards the deck. A large amount of operating space is therefore required for the mechanical hand to perform the required movements. Alternatives have been proposed in which a cartridge extracted from the rack is received by a carriage which carries the cartridge towards the deck. Mechanical grippers are mounted in the carriage to grip opposite side edges of a cartridge in the rack, the grippers being provided with conveyor belts to draw the cartridge into the carriage. In operation, the carriage is moved to align the grippers with a cartridge to be extracted, the grippers are then closed on the opposite edges of the cartridge and the conveyor belts activated to convey the cartridge into the carriage. Such an arrangement can save operating space in the direction of extraction of a cartridge from the rack, but the double gripper mechanism is relatively complex, and once a cartridge has been conveyed into the carriage, the grippers must be moved apart so as to clear other cartridges in the rack when the carriage is then moved. This requires additional operating space on either side of the rack. Moreover, the drive mechanism for the grippers is relatively bulky, and when the carriage is aligned with a cartridge at either end of the rack, the drive mechanism projects beyond the end of the rack. Since clearance must be provided for the drive mechanism beyond the ends of the rack, the required operating space is again increased.

SUMMARY OF THE INVENTION

According to one aspect of the invention there is provided autoloader apparatus for tape cartridges, the apparatus comprising:

a cartridge rack for storing an array of cartridges arranged adjacent one another;

a carriage having two compartments for receiving cartridges from the rack, the compartments being offset relative to one another in the direction of the array; and conveyor means for moving cartridges from the rack into the compartments of the carriage;

wherein the carriage is mounted for movement along the array whereby each of the cartridges can be brought into alignment with at least one of the compartments for reception thereby.

In accordance with this aspect of the invention, therefore, the carriage has two cartridge-receiving compartments which are offset from one another along the direction of the array of cartridges in the rack. The drive mechanism for the conveyor means can be housed within the confines of the carriage along the direction of the array, and each of the compartments can be brought into alignment with a cartridge at a respective end of the array without the operating mechanism projecting beyond the end of the rack. Thus, by providing the two compartments in the carriage, all cartridges can be accessed by one or other of the compartments without requiring additional space beyond the ends of the rack to provide clearance for the drive mechanism. With such an arrangement, therefore, the size of the autoloader can be reduced for a given number of cartridges, or more cartridges can be contained in an autoloader of given size.

Depending upon the dimensions of the drive mechanism mounted on the carriage, the two compartments may overlap one another along the direction of the array. Preferably, however, the compartments are spaced apart from one another in the carriage to reduce constraints on the dimensions of the operating mechanism.

Preferably, the cartridge rack is arranged for storing a substantially horizontal linear array of cartridges, though of course other arrangements, such as curved or vertical arrays, may be envisaged.

While the conveyor means may be movable relative to the carriage for conveying a cartridge into either one of the compartments, in a preferred arrangement the apparatus includes first and second conveyor means for moving cartridges from the rack into respective ones of the two compartments of the carriage.

According to a further aspect of the invention, there is provided autoloader apparatus for tape cartridges, the apparatus comprising:

a cartridge rack for storing cartridges side by side with respective edge faces of the cartridges being supported by a floor of the rack, the floor having a plurality of openings aligned with respective edge faces of cartridges stored in the rack; and conveyor means which is mounted for movement beneath the floor of the rack into alignment with the openings, the conveyor means being movable upwardly into engagement with the edge face of a cartridge through the corresponding opening and operable to move the cartridge along the direction of the edge face thereof to withdraw the cartridge from the rack.

In accordance with this aspect of the invention, therefore, the cartridges are orientated vertically and supported on their edge faces, and the conveyor means is movable upwardly, through an opening in the rack, into engagement with the edge face of the cartridge, whereby the weight of the cartridge on the conveyor provides the grip necessary for the conveyor to move the cartridge out of the rack. Thus, a second conveyor, gripping the opposite edge of the cartridge, is not required, resulting in simplification of the apparatus and reduction of required operating space.

The openings in the floor of the rack are preferably slots which extend along the direction of movement of cartridges out of the rack, and the conveyor means preferably comprises a conveyor belt for engaging the edge face of a cartridge through a said slot, the belt being driven to effect movement of the cartridge out of the rack.

Where the conveyor means is mounted on a carriage for receiving a cartridge withdrawn from the rack, a separate conveyor mechanism may be provided in the carriage for conveying a cartridge out of the carriage into a cartridge deck. It is preferred, however, that the conveyor means extends beneath a cartridge received by the carriage, in engagement with the edge face of the cartridge, whereby the conveyor means is further operable to move a cartridge out of the carriage. In this case, in a highly advantageous embodiment the conveyor means comprises a first conveyor portion for engaging a cartridge in the rack, and a second conveyor portion for engaging a cartridge in the carriage, the first conveyor portion being movable relative to the second conveyor portion to remove the first conveyor portion from a said opening in the rack once the cartridge has been transferred to the carriage. The advantages of such an embodiment will be described in more detail below. The first conveyor portion is preferably movable upwardly relative to the second conveyor portion to engage a cartridge in the rack, and downwardly relative to the second conveyor portion once the cartridge has been transferred to the carriage.

While the grip between the conveyor and a cartridge moved thereby can be provided solely by the weight of the cartridge on the conveyor, in some embodiments the grip may be improved by the action of means, such as resilient pressure fingers, for example, provided in the rack and carriage to engage the top edge of the cartridge.

Where the conveyor means comprises first and second conveyor portions, the openings in the floor of the rack are preferably closed-ended slots extending along the direction of movement of cartridges out of the rack. The conveyor means preferably includes a conveyor belt, the first conveyor portion comprising a first belt support means for effecting engagement of the belt with a cartridge in the rack, and the second conveyor portion comprising a second belt support means for effecting engagement of the belt with a cartridge in the carriage.

In autoloader apparatus embodying the invention where the cartridge rack holds a horizontal array of cartridges, the apparatus preferably includes a cartridge deck positioned on the opposite side of the carriage to the rack, the carriage being mounted for transverse movement between the rack and the cartridge deck, and the cartridge deck having a vertically orientated access slot which is substantially vertically aligned with cartridges stored in the rack, whereby a cartridge can be conveyed from the carriage into the access slot of the deck by the conveyor means. This provides a particularly efficient overall arrangement for a desk-top autoloader system.

BRIEF DESCRIPTION OF THE DRAWINGS

The above and other objects, features and advantages of the invention will be apparent from the following detailed description of the illustrative embodiments which is to be read in connection with the accompanying drawings, in which:

FIGS. 5a, 5b and 5c are schematic cross-sectional views illustrating respective stages in a loading operation of the apparatus with a preferred form of conveyor means and modified carriage and cartridge magazine.

DESCRIPTION OF THE PREFERRED EMBODIMENTS

Figure 1:
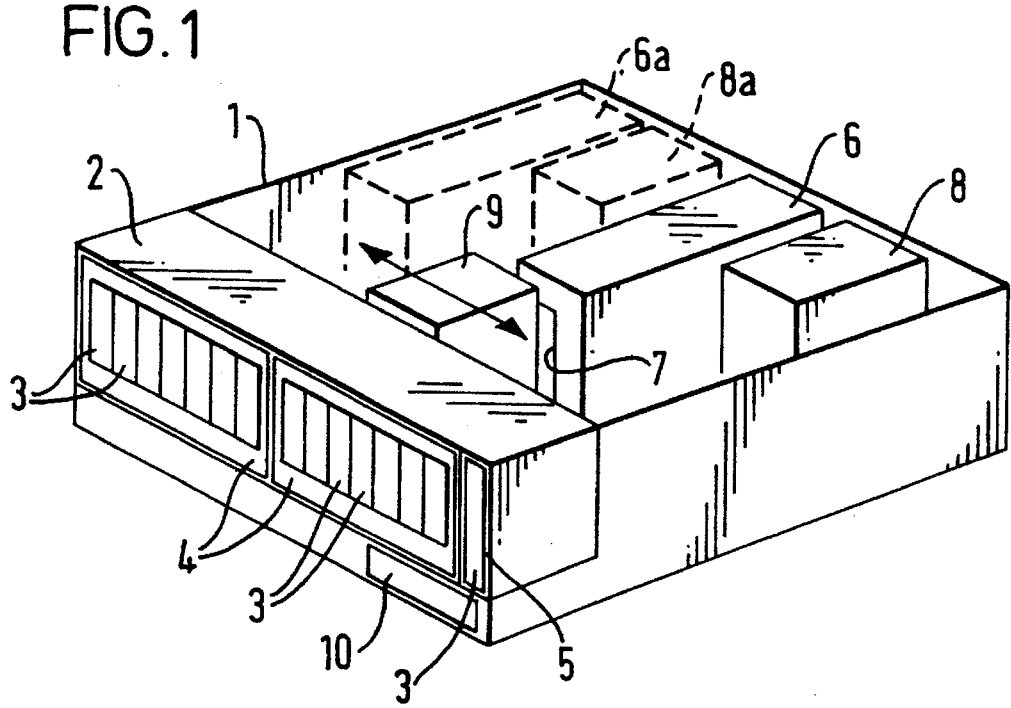
FIG. 1 is an overall schematic view of autoloader apparatus embodying the invention.

FIG. 1 is a simplified schematic view of autoloader apparatus embodying the invention in the form of a desk-top autoloader unit 1. The unit has a generally rectangular housing and comprises a cartridge rack, indicated generally at 2, for storing a horizontal array of 3480-style half-inch tape cartridges 3. The rack 2 is located at the front of the housing and comprises two removable magazines, indicated schematically at 4, each of which holds seven cartridges 3 and can be slotted into the open front of the housing. Handles (not shown) are provided on the magazines 4 to facilitate removal and insertion of the magazines. The cartridge rack 2 further comprises a single-cartridge compartment 5 defined by the housing at the right-hand end of the rack as shown in the figure. The compartment 5 is a priority access compartment the function of which will be described further below.

A cartridge deck 6 for recording/reproducing the cartridges 3 is located at the rear of the housing. The deck 6 is positioned on its side with its access slot 7 orientated vertically and substantially vertically aligned with cartridges 3 in the rack. A power supply unit (PSU) 8 for the deck 6 is located adjacent the deck. A carriage for conveying cartridges between the rack and deck is indicated schematically at 9. The carriage is mounted between the rack 2 and deck 6 for transverse movement along the array of the cartridges 3.

In operation, the carriage 9 is moved along the cartridge rack 2 into alignment with a desired cartridge, and conveyor means (not shown in FIG. 1) mounted on the carriage is operated to convey the cartridge out of the rack 2 into the carriage. The carriage 9 is then moved to align the cartridge with the access slot 7 of the deck, and the conveyor means activated to convey the cartridge out of the rear of the carriage into the deck 6. After recording/reproduction of the cartridge, the carriage 9 receives the cartridge ejected from the deck 6 and returns the cartridge to the rack. Operation of the deck 6, PSU 8, carriage 9 and the conveyor means is controlled by a control unit (not shown in FIG. 1) which is responsive to operation of a control panel 10 on the front of the unit and may also be subject to external control, for example by a computer system.

As indicated by the broken lines in FIG. 1, the autoloader unit 1 may contain a further cartridge deck 6a and associated PSU 8a, positioned next to the deck 6. The cartridge deck 6a can accessed by the carriage 9 in the same way as the deck 6. The unit 1 may also include other components, for example a tape cleaner unit which may be located in front of the power supply unit 8, for periodic cleaning of the cartridges 3 under control of the control unit.

Figure 2:
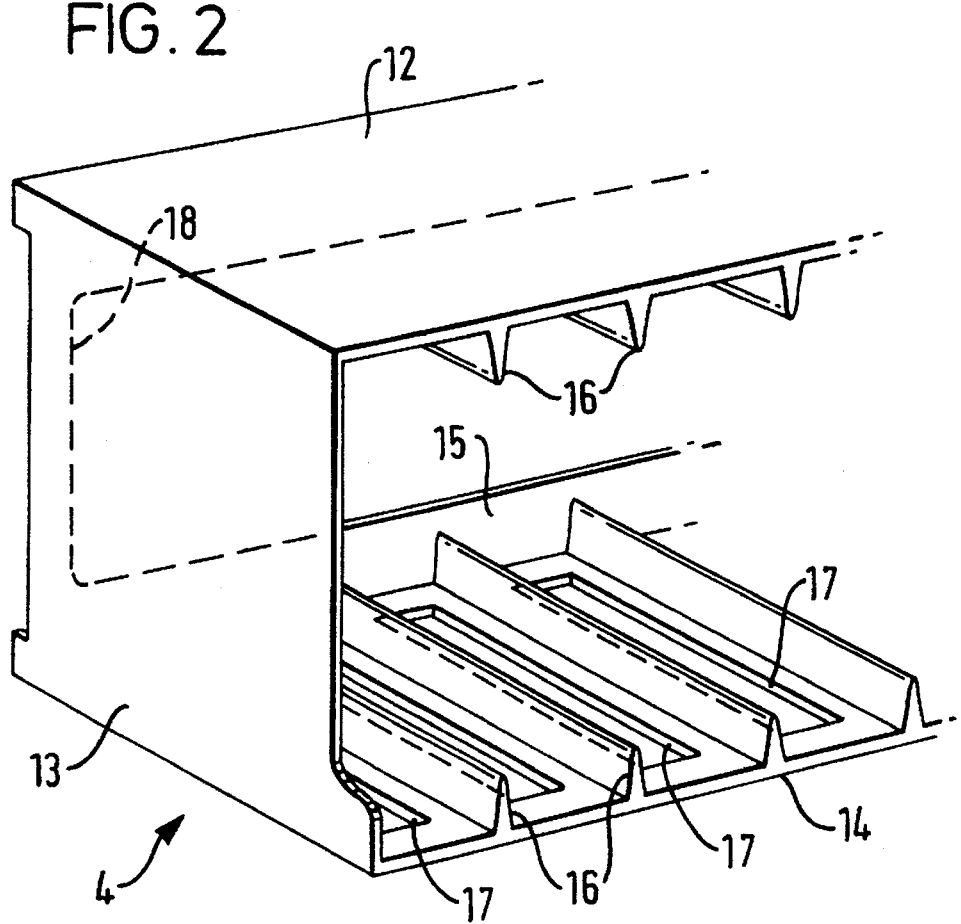
FIG. 2 illustrates part of a removable magazine of the cartridge rack of the apparatus of FIG. 1.

FIG. 2 shows part of a removable magazine 4 of the cartridge rack 2 illustrating the structure in more detail. The magazine 4 has a top panel 12, side panels 13 (only one of which can be seen in the figure), a bottom panel 14 and a rear panel 15 which faces the front of the autoloader unit 1 when the magazine is inserted in the housing. The top and bottom panels 12, 14 of the magazine 4 have corresponding downwardly and upwardly extending ribs 16 formed thereon which partition the magazine into seven compartments for receiving respective cartridges 3. Elongate, closed-ended slots 17 are formed between the upwardly extending ribs 16 in the bottom panel 14 such that, when cartridges are inserted into the magazine 4, the slots 17 are aligned with the edge faces of the cartridges which rest on the lower panel 14. The rear panel 15 of the magazine 4 has an elongate opening 18 therein so that, when the magazine is inserted in the autoloader housing, any identifying labels on the front edge faces of the cartridges can be viewed from the front of the unit.

As previously described, the cartridge rack 2 consists of two seven-cartridge magazines 4 arranged side by side and a single-cartridge priority access compartment 5 defined by the unit housing at one end of the rack. The portion of the housing forming the floor of the compartment 5 has a slot therein identical to the slots 17 in the lower panels 14 of the magazines 4. Thus, the floor of the cartridge rack 2 in the loaded unit is formed by the lower panels 14 of the magazines 4 together with the floor of the priority access compartment 5, a slot being provided in the rack floor for each cartridge position.

Figure 3:
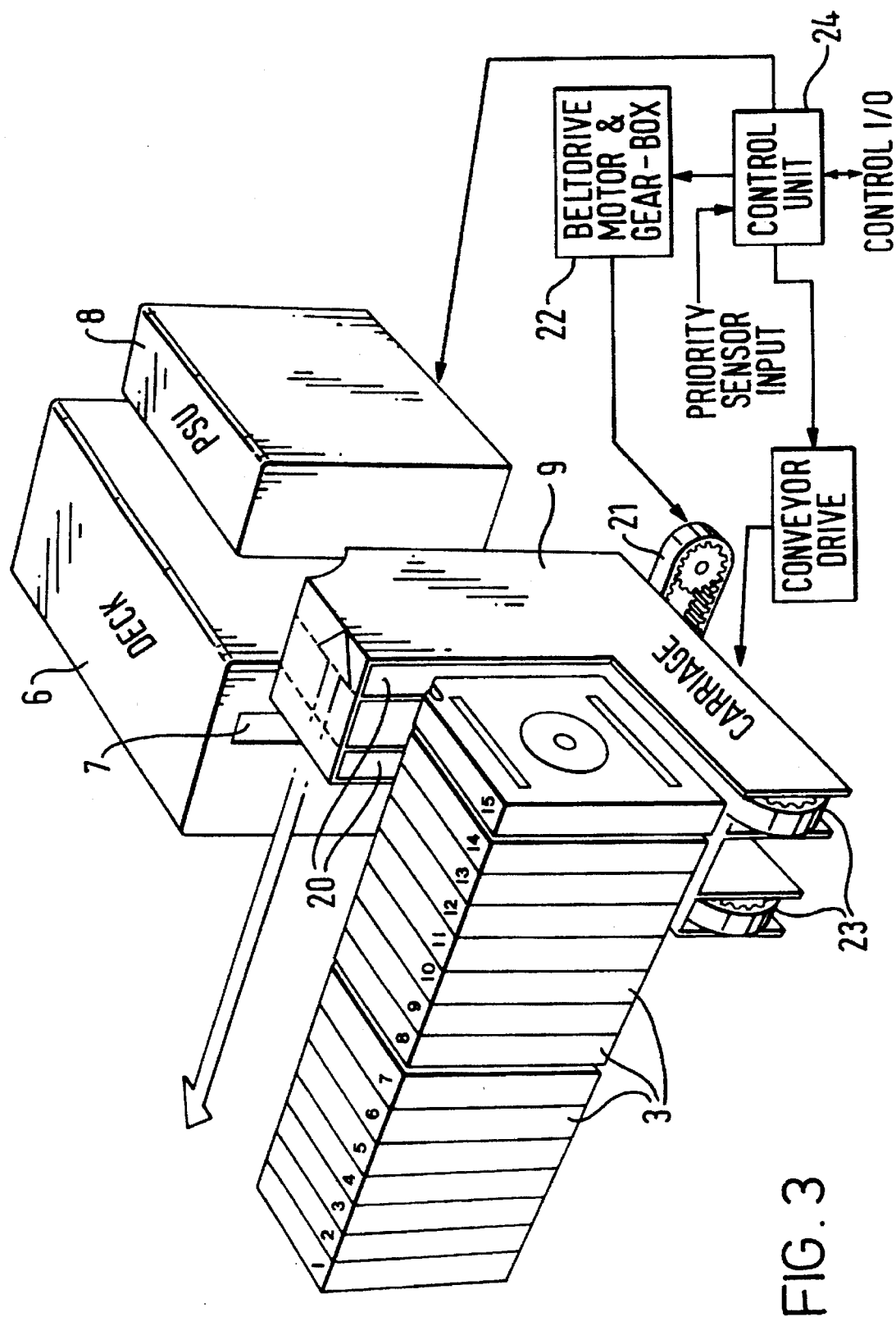
FIG. 3 is a schematic illustration of part of the autoloader apparatus showing the carriage in more detail.

FIG. 3 illustrates parts of the autoloader unit 1 in more detail. In FIG. 3, the housing and magazines are omitted for clarity, but the cartridges, numbered 1 to 15, are shown in their loaded positions. Cartridges 1 to 7 and 8 to 15 correspond to those housed in the two magazines 4, and cartridge 15 corresponds to a cartridge in the priority access compartment 5 of the rack. As illustrated in the figure, the carriage 9 has two cartridge receiving compartments 20 which are spaced from one another along the direction of the cartridge array. In this example, the compartments 20 are spaced apart by about two cartridge widths. The compartments 20 are open at the front and rear of the carriage for passage of cartridges therethrough. The upper rear section of the carriage 9 is cut-away for reasons which will become apparent below.

The carriage 9 is mounted for transverse movement along the direction of the array on a transverse belt 21 which is driven by a belt motor and gear-box indicated schematically at 22. Two conveyors 23 are mounted on the carriage and extend beneath the floor of the rack 2, each conveyor 23 being positioned for conveying a cartridge into a respective compartment 20 of the carriage. The conveyors 23 are driven by a conveyor drive mechanism (not shown in FIG. 3) which is mounted on the carriage 9. The belt motor and gear-box 22 and the conveyor drive mechanism operate under control of the control unit, indicated schematically at 24, which also controls operation of the deck 6 and its associated PSU 8.

The control unit 24 contains a memory for storing data indicative of which cartridges 3 have been recorded and the data recorded thereon. When the control unit 24 receives a control input instructing the recording of data, the control unit activates the belt motor 22 to drive the transverse belt 21 until one of the compartments 20 is aligned with the cartridge to be recorded, for example the next blank cartridge in the array. When the carriage 9 is correctly positioned, one of the conveyors 23 is aligned with the slot 17 in the floor of the rack beneath the selected cartridge. The control unit 24 then activates the conveyor drive mechanism such that the appropriate conveyor 23 is moved upwardly through the slot 17 into engagement with the lower edge of the cartridge. The conveyor 23 is then driven to move the cartridge along the direction of the slot into the compartment 20 of the carriage. The conveyor drive then retracts the conveyor 23 from the slot 17, and the control unit 24 again activates the transverse belt motor 22 to move the carriage 9 until the compartment 20 is aligned with the access slot 7 of the cartridge deck 6. The conveyor drive is then reactivated so that the appropriate conveyor 23 moves the cartridge out of the compartment 20 through the rear of the carriage 9 into the slot 7 of the deck. The control unit 24 then activates the deck 6 to record data on the cartridge as required. When recording is finished, and the cartridge ejected from the deck 6, the above operations are reversed to return the cartridge to the rack. During this process, the control unit 24 provides control outputs to indicate the operating state of the unit to a display on the control panel 10 or to an external monitor.

In the above arrangement, the drive mechanism for the conveyors 23 is mounted on the underside of the carriage 9 and, in view of the extra width of the carriage due to the two spaced compartments 20, the drive mechanism can be housed entirely with the confines of the carriage along the direction of movement. That is to say, the conveyor drive mechanism does not project laterally beyond the sides of the carriage. When one of the cartridges numbered 4 to 12 in the array is to be accessed, either one of the compartments 20 of the carriage can be aligned with the cartridge for reception thereof. However, the control means is programmed so that, if one of cartridges 1 to 3 is to be accessed, it is always the left-hand compartment 20 of the carriage as viewed in the figure which is positioned to receive this cartridge. Equally, if one of cartridges 13 to 15 is selected, it is always the right-hand compartment 20 of the carriage which is positioned to receive this cartridge. In this way, even when cartridges at the extreme end of the array are accessed, the carriage 9, and conveyor drive mechanism mounted thereon does not project to any appreciable extent beyond the ends of the cartridge rack. Thus, all cartridges in the array can be accessed by one or other of the compartments 20 without requiring clearance beyond the ends of the array. The minimum width of the unit is therefore defined solely by the length of the cartridge rack so that the overall width of the unit can be reduced as compared with the known systems described above. Alternatively, a larger number of cartridges can be stored in a unit of given width. In this particular embodiment, the cartridge pack can accommodate 15 cartridges where a known unit of similar width would only allow storage for 14 cartridges at most.

In the particular embodiment described herein, the extra space in the rack is used for the priority access compartment 5. This compartment contains a sensor (not shown) which provides an output to a priority sensor input of the control unit 24 when a cartridge is inserted in the compartment 5. On receipt of a signal from this sensor, any operation currently in progress is interrupted and the control means 24 immediately loads the priority cartridge into the deck 6 after first unloading any cartridge in the deck if necessary. Thus, the priority access compartment 5 enables an operator to override any preprogrammed operation sequence for immediate recording or reproduction of a given cassette.

Figure 4A:
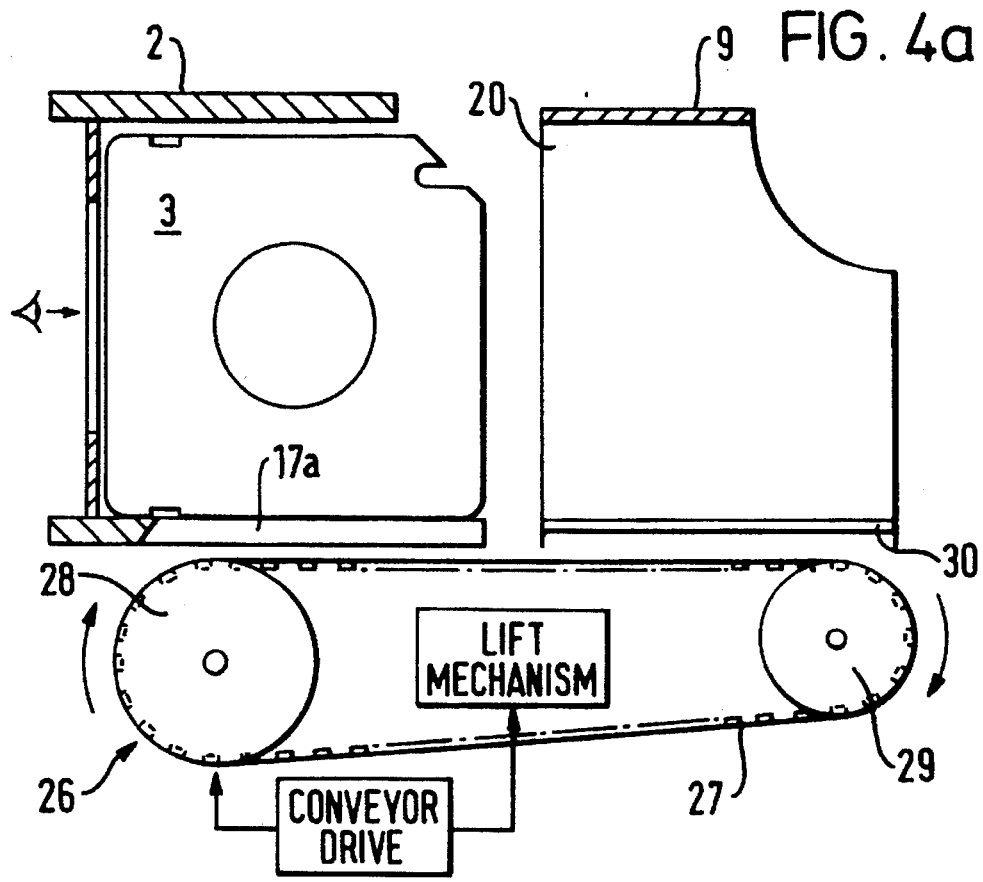
FIGS. 4a and 4b are schematic cross-sectional views illustrating respective stages in a loading operation of the apparatus with one form of conveyor means.
Figure 4B:
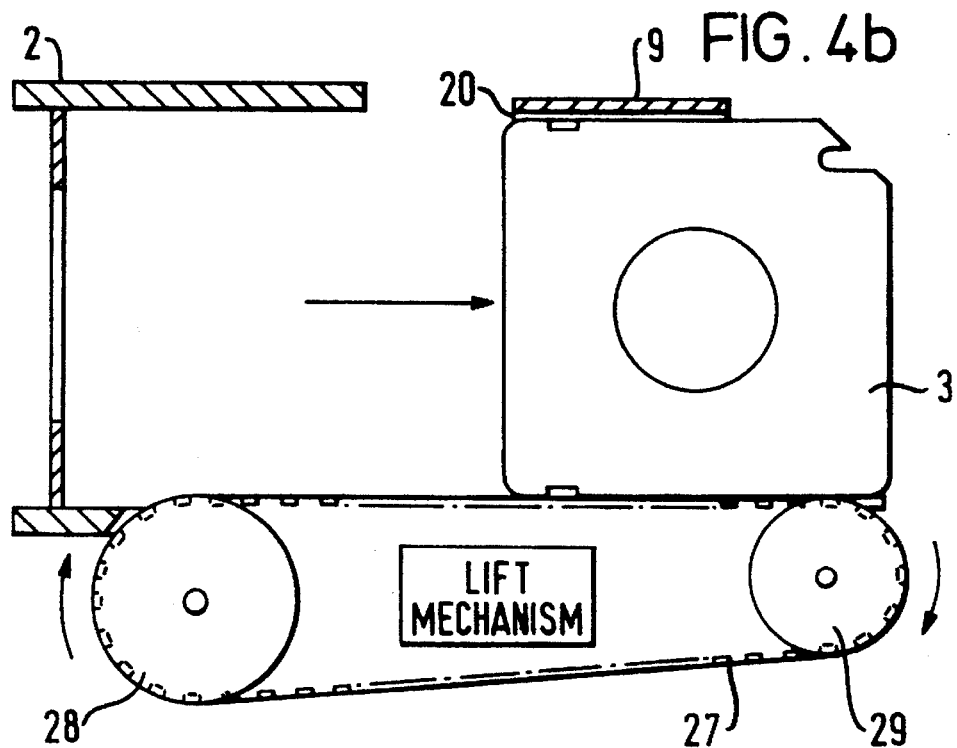

FIGS. 4a and 4b are schematic cross-sections through the cartridge rack 2 and carriage 9 showing successive stages in a loading operation with one form of conveyor means 23. In this embodiment, each conveyor 23 of FIG. 3 comprises an endless belt conveyor mechanism indicated generally at 26. Only one of the conveyors 26 is shown for clarity, though there are in fact two arranged as shown in FIG. 3. The conveyor 26 extends beneath the rack 2 and the carriage 9 and comprises a conveyor belt 27 supported at one end by a drive pulley 28 and the other end by a pulley 29. The pulleys 28, 29 are mounted on the lower portion of the carriage 9 by a mechanical lift mechanism which is operable by the conveyor drive to raise and lower the pulleys, and hence the belt 27, relative to the carriage 9.

In FIG. 4a, the carriage 9 is aligned for receiving a cartridge 3 from the rack 2 so that the conveyor 26 is aligned with a slot in the floor of the rack. With this embodiment of the conveyor, the slots 17 in the floor of the rack must be open-ended slots 17a as indicated in the figure. Also, with this embodiment of the conveyor the compartments 20 of the carriage 9 must be provided with means for supporting a cartridge, in this example a compartment floor 30 having an open-ended slot therein for access of the conveyor. In operation, the carriage 9 is moved so that the compartment 20 is aligned with the selected cartridge 3, and the conveyor drive activates the lift mechanism of the conveyor 26 beneath that cartridge so that the pulleys 28, 29 and the belt 27 move upwardly relative to the carriage into engagement with the lower edge of the cartridge through the open ended slot 17a. The conveyor drive mechanism then activates the drive pulley 28 to drive the belt 27 in the direction shown by the arrows in the figure to move the cartridge 3 out of the rack 2 and into the carriage 9. This stage in the operation is illustrated in FIG. 4b. The conveyor drive then activates the lift mechanism to lower the conveyor 26 out of the slot 17a and out of engagement with the cartridge which is then supported by the compartment floor 30. The carriage 9 is then moved along the array to align the cartridge with the access slot 7 of the deck 6 whereupon the conveyor lift mechanism is again activated to lift the conveyor 26 into engagement with the cartridge in the carriage. The drive pulley 28 is again activated to drive the belt 27 so that the cartridge resting thereon is conveyed into the access slot 7. A mechanism (not shown) is provided to push the trailing edge of the cartridge into the access slot 7 whereupon the internal mechanism of the deck 6 takes over to draw the cartridge onto the supply hub.

While in the above embodiment the conveyor 26 is operable both to extract a cartridge from the rack and insert the cartridge into the deck, there are a number of disadvantages with this particular arrangement. Firstly, the slots in the floor of the rack must be open-ended slots 17a as illustrated. This leads to a relatively weak construction for the floor of the magazines 4 which are then liable to breakage. A further problem is that, when the conveyor 26 is activated to drive a cartridge into the deck 6, the conveyor will also engage any cartridge in the rack 2 at that position of the carriage and drive this cartridge into the carriage as the first cartridge is driven into the deck. This means that after loading of a cartridge into the deck, the belt 27 must be driven in the opposite direction to return the extracted cartridge back to the rack 2. A preferred construction of the conveyors 23, which overcomes these disadvantages, will now be described with reference to FIGS. 5a to 5c.

Referring to FIG. 5a, the preferred form of conveyor is indicated generally at 33. Only one conveyor 33 is shown, though again there are in fact two, one associated with each compartment 20 of the carriage, arranged as shown in FIG. 3.

The preferred conveyors 33 can be used with the magazine 4 of FIG. 2, but here the magazine 4 is shown in a modified form which has downwardly projecting resilient pressure fingers 11a formed in the top panel of the magazine above each cartridge compartment by a partially cut-out strip of the top panel which is pressed downwardly relative to the plane of the top panel. (Alternatively the pressure fingers 11a could be formed by leaf-springs or the like fixed to the underside of the top panel above each cartridge receiving compartment. In this embodiment, the carriage 9 is provided with similar pressure fingers 11b, one above each compartment 20 thereof.

The conveyor 33 comprises a conveyor belt 34 mounted on first and second belt support portions. The first belt support portion comprises two pulleys 35 and 36 which are mounted for rotation on a bracket (FIG. 6) which is in turn mounted for vertical movement relative to the carriage 9 by a lift mechanism 37 described in more detail below. The second belt support portion comprises a drive pulley 38 and an idler 39 mounted for rotation on the carriage 9. A radius arm 40 is pivotably connected at one end to the carriage 9 and at the other end to the axle of the pulley 36. Two belt tensioning pulleys 41 tension the belt 34 on either side of the radius arm pivot point. The drive pulley 38 is driven by the conveyor drive mechanism which also drives the mechanical lift mechanism 37 to pivot the first conveyor portion upwardly or downwardly relative to the second conveyor portion about the radius arm pivot point. In this embodiment, therefore, only the first, or front, portion of the conveyor 33 moves up or down relative to the carriage, the second, or rear, portion of the conveyor 33 having a fixed vertical position relative to the carriage.

FIG. 5a shows the carriage 9 positioned to receive a cartridge 3 from the rack 2, the front portion of the conveyor 33 being aligned with the closed-ended slot 17 in the floor of the magazine 4. To remove the cartridge from the rack, the conveyor drive mechanism first activates the lift mechanism 37 to raise the front conveyor portion upwardly through the slot 17 into engagement with the lower edge face of the cartridge. The conveyor drive mechanism then activates the drive pulley 38 to drive the belt 34 in the clockwise direction whereby the cartridge resting on the belt is driven towards the carriage 9. During this movement, the pressure finger 11a presses against the top of the cartridge to improve the grip between the conveyor and cartridge and steady the cartridge movement. As the leading portion of the cartridge enters the carriage, the lower edge of the cartridge engages the belt 34 on the rear portion of the conveyor and the pressure finger 11b in the carriage engages the upper edge of the cartridge. Continued movement of the belt draws the cartridge fully into the compartment 20 of the carriage. This stage in the loading operation is illustrated in FIG. 5b.

After reception in the carriage, the lift mechanism 37 is again activated to lower the front portion of the conveyor 33 out of the slot 17 in the floor of the rack 2, but the cartridge is still supported in the carriage by the rear portion of the conveyor. (Thus, here the carriage does not need to have a cartridge-supporting floor 30 as in the embodiment of FIGS. 4a and 4b). The carriage 9 is then moved laterally until the cartridge is aligned with the access slot 7 of the deck 6, whereupon the belt 34 is again driven to convey the cartridge out of the rear of the carriage into the access slot 7.

Figure 5C:
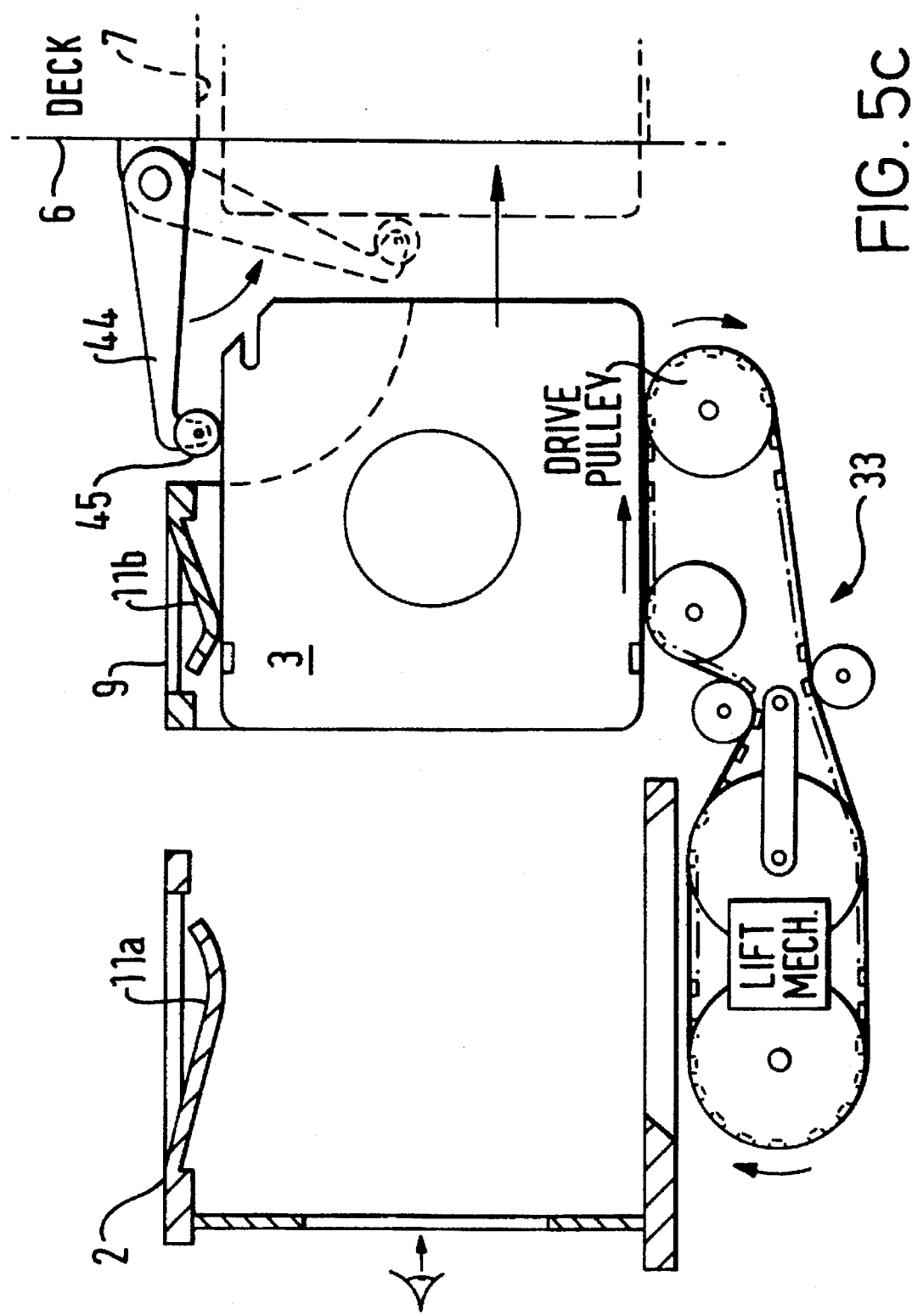

FIG. 5c illustrates schematically a mechanism, in the form of pivotable arm 44 mounted on the deck 6, for drawing the trailing edge of the cartridge into the access slot 7 of the deck. The arm 44 is pivotably mounted at one end above the access slot 7 and has a roller 45 which is freely rotatable at its other end. The arm 44 is biased downwardly, but when the deck is empty, the arm is latched in its upward position as shown by the solid lines in FIG. 5c. When the carriage 9 is positioned to load a cartridge into the deck, the latch is released and the roller 45 rests on the upper edge of the cartridge 3. As the conveyor 33 is operated to drive the cartridge into the slot 7, the roller 45 rolls along the top of the cartridge and then down the trailing edge thereof such that, after the cartridge has cleared the conveyor belt 34, the bias of the arm 44 draws the cartridge further into the slot 7. To allow clearance for the arm 44 during this movement, the upper rear corner of the carriage 9 is cut away as previously described. When the cartridge is subsequently ejected from the deck, the arm 44 is forced upwardly into its latched position by the emerging cartridge.

It will be appreciated that, by making the front portion of the conveyor 33 pivotable relative to the rear portion, the problems associated with the conveyor 26 of FIGS. 4a and 4b are avoided. The operation is therefore more efficient, and since the slots 17 are closed-ended slots, the strength and durability of the cartridge rack is improved.

Figure 6:
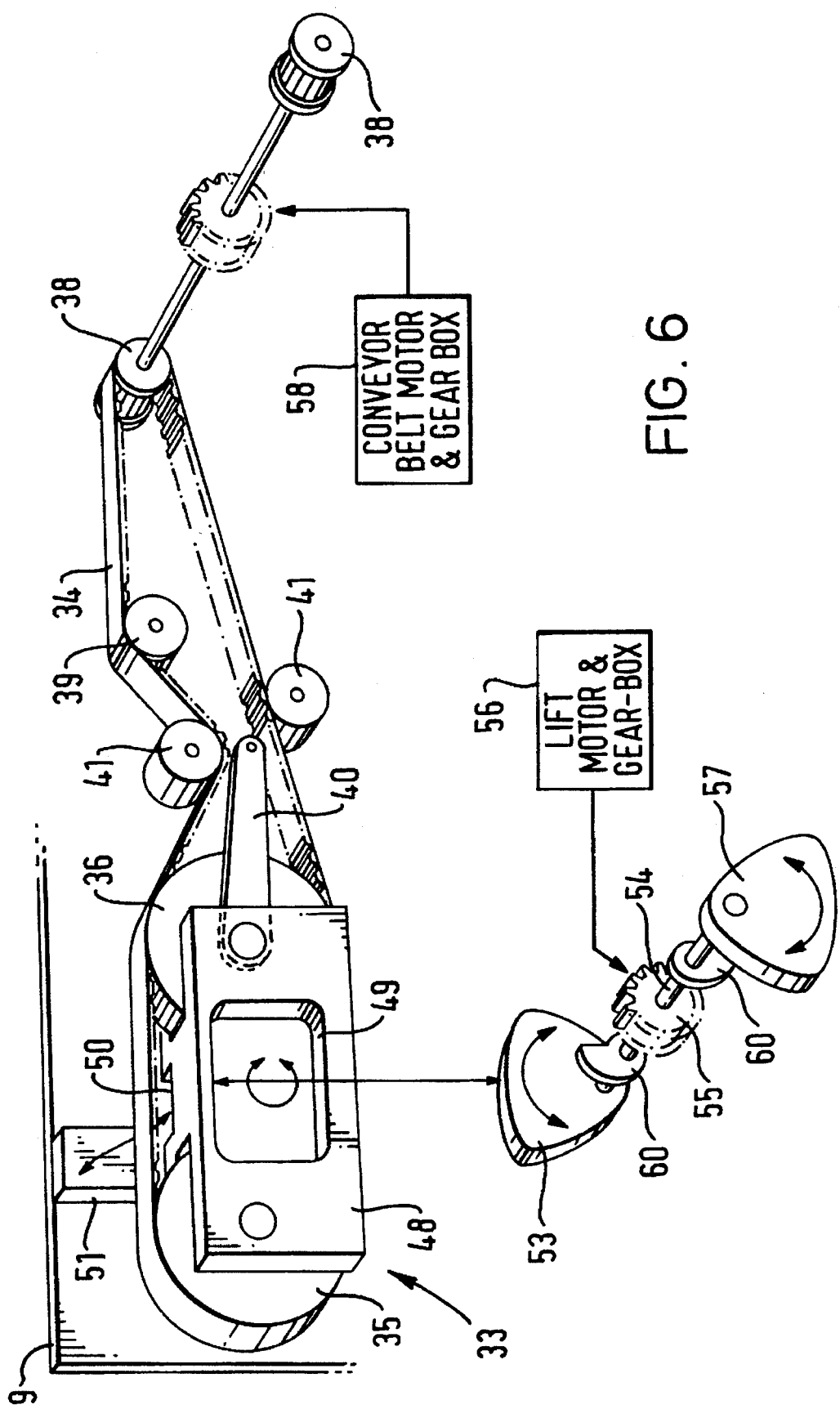
FIG. 6 is a schematic diagram illustrating in more detail the structure and operation of the conveyor means of FIGS. 5a to 5c.

FIG. 6 illustrates in more detail the structure and operation of the preferred conveyor arrangement just described. In the figure, only one conveyor 33 is again shown, this being the left-hand conveyor of the pair as viewed in the arrangement of FIG. 3. As illustrated, the pulleys 35 and 36 of the front conveyor portion are mounted on a bracket 48 having a camming recess 49 on the inner side thereof, and a generally vertical guide slot 50 (only partially visible in the figure) on the outer side thereof. The guide slot 50 receives a lift guide 51 mounted on the inner side of the outer wall of the carriage 9 next to the conveyor. The pulleys 38, 39 and 41 are mounted on the wall of the carriage 9, and one end of the radius arm 40 is pivotably fixed to the carriage. As the bracket 48 and pulleys 35, 36 move up and down, the lift guide 51 on the carriage wall slides in the guide slot 50 of the bracket to provide controlled movement.

The up/down movement of the front conveyor portion is effected by a cam 53 acting in the camming recess 49 of the bracket 48. The cam 53 is mounted on one end of the spindle 54 having a central gear wheel 55 which is driven by a lift motor and gear-box 56 of the conveyor drive mechanism mounted on the carriage. It will be seen that, as the cam 53 rotates in the camming recess 49 of the bracket 48, the bracket 48 will slide up or down on the lift guide 51, thus raising or lowering the front conveyor portion in the carriage 9. An identical cam 57 is mounted on the other end of the spindle 54, 180 degrees out of phase with the cam 53. The cam 57 acts in an identical camming recess of a bracket 48 of the second conveyor 33 on the other side of the carriage 9. The drive pulleys 38 of the two conveyors 33 are also interconnected and driven by a single conveyor belt drive motor and gear-box 58 of the conveyor drive mechanism. Thus, the two conveyors 33 move up and down in antiphase, so that only one conveyor 33 engages a cartridge in the rack at any time. This prevents the possibility of fouling if the cartridges are not equally spaced all along the array, and in particular where the pair of conveyors are on either side of the boundary between the two magazines 4 in the rack of FIGS. 1 to 3. Rotary flags 60 may be provided in the spindle 54 as shown in FIG. 6 to interrupt the beams of respective infra-red sensors (not shown) as the spindle rotates to allow the control unit 24 to sense the rotary position.

It is to be appreciated that many variations and modifications may be made to the particular embodiments described above. For example, while pressure fingers 11a, 11b are provided in the rack and carriage in the embodiment of FIGS. 5a to 5c, these can be omitted if desired since effective operation can still be achieved where no downward pressure is applied to the upper edge of the cartridge. Alternatively, the pressure fingers could be replaced by rollers or skids for example.

Further, although illustrative embodiments of the invention and modifications thereof have been described in detail herein with reference to the accompanying drawings, it is to be understood that the invention is not limited to those precise embodiments and modifications, and that various other changes and modifications can be effected therein by one skilled in the art without departing from the scope and spirit of the invention as defined by the appended claims.

I claim:

1. An apparatus for loading tape cartridges into a deck, and unloading them from the deck, the apparatus comprising:
   a cartridge rack for storing an array of cartridges arranged adjacent one another;
   a carriage having two compartments for selectively receiving a cartridge from the rack, the compartments being offset relative to one another in the direction of the array; and
   a conveyor for moving cartridges from the rack into the compartments of the carriage, the carriage being mounted for movement along the array so that each of the cartridges can be brought into alignment with at least one of the compartments for reception thereby;
   wherein the cartridge rack is arranged for storing cartridges side by side with respective edge faces of the cartridges being supported by a floor of the rack, the floor having a plurality of elongate openings aligned with respective edge faces of cartridges stored in the rack, and wherein the conveyor is mounted for a first movement beneath the floor of the rack along the array and into alignment with one of the plurality of elongate openings and for a second movement upwardly into engagement with the edge face of a cartridge through the corresponding opening and operable to move the cartridge in the direction of the elongate opening to withdraw the cartridge from the rack.

2. Apparatus as claimed in claim 1, including control means for controlling movement of the carriage to align one of the compartments thereof with a cartridge to be assessed in the rack, the control means being operable such that when the cartridge at an end of the array is to be accessed, it is the compartment on the corresponding end of the carriage which is brought into alignment therewith.

3. Apparatus as claimed in claim 1, wherein the compartments are spaced apart from one another in the carriage.

4. Apparatus as claimed in claim 1, wherein the cartridge rack is arranged for storing a substantially horizontal, linear array of cartridges.

5. Apparatus as claimed in claim 1, wherein the cartridge rack comprises at least one cartridge magazine which is removably mounted in a housing of the apparatus.

6. Apparatus as claimed in claim 1, including a first and second conveyor for selectively moving a cartridge from the rack into a respective one of the two compartments of the carriage.

7. Apparatus as claimed in claim 1, wherein the conveyor is mounted on the carriage and extends beneath a cartridge received by the carriage, in engagement with the edge face of the cartridge, whereby the conveyor is further operable to move a cartridge out of the carriage.

8. Apparatus as claimed in claim 1, including a cartridge deck positioned on the opposite side of the carriage to the rack, the carriage being mounted for transverse movement between the rack and cartridge deck, wherein the cartridge deck has a vertically orientated access slot which is substantially vertically aligned with cartridges stored in the rack, whereby a cartridge can be conveyed from the carriage into the access slot of the deck by the conveyor.

9. An apparatus for loading tape cartridges into and unloading them from a deck, the apparatus comprising:

a cartridge rack for storing cartridges substantially vertically upright side by side with respective edge faces of the cartridges being supported by a floor of the rack, the floor having a plurality of elongate openings aligned with respective edge faces of cartridges stored in the rack; and a conveyor mounted for movement beneath the floor of the rack into alignment with the openings, the conveyor being movable upwardly into engagement with the edge face of a cartridge through the corresponding elongate opening and operable to move the cartridge along the direction of the elongate opening to withdraw the cartridge from the rack.

10. Apparatus as claimed in claim 9, wherein the openings in the floor of the rack are slots which extend along the direction of movement of cartridges out of the rack, and wherein the conveyor means comprises a conveyor belt for engaging the edge face of a cartridge through a said slot.

11. Apparatus as claimed in claim 9, wherein the conveyor means is mounted on a carriage for receiving a cartridge withdrawn from the rack, the carriage being movable to align the conveyor means with the openings in the rack, and wherein the conveyor means extends beneath a cartridge received by the carriage, in engagement with the edge face of the cartridge, whereby the conveyor means is further operable to move a cartridge out of the carriage.

12. Apparatus as claimed in claim 11, wherein the conveyor means comprises a first conveyor portion for engaging a cartridge in the rack and a second conveyor portion for engaging a cartridge in the carriage, wherein the first conveyor portion is movable relative to the second conveyor portion to remove the first conveyor portion from a said opening in the rack once the cartridge has been transferred to the carriage.

13. Apparatus as claimed in claim 12, wherein the first conveyor portion is movable upwardly relative to the second conveyor portion to engage a cartridge in the rack, and downwardly relative to the second conveyor portion once the cartridge has been transferred to the carriage.

14. Apparatus as claimed in claim 12, wherein the openings in the rack are closed-ended slots which extend along the direction of movement of cartridges out of the rack.

15. Apparatus as claimed in claim 12, wherein the conveyor means includes a conveyor belt, the first conveyor portion comprises a first belt support means for effecting engagement of the belt with a cartridge in the rack, and the second conveyor portion comprises second belt support means for effecting engagement of the belt with a cartridge in the carriage.

16. Apparatus as claimed in claim 11, including a cartridge deck positioned on the opposite side of the carriage to the rack, the carriage being mounted for transverse movement between the rack and cartridge deck, wherein the cartridge deck has a vertically orientated access slot which is substantially vertically aligned with cartridges stored in the rack, whereby a cartridge can be conveyed from the carriage into the access slot of the deck by the conveyor means.

* * * * *